(12) United States Patent
Boyd et al.

(10) Patent No.: US 6,330,396 B1
(45) Date of Patent: Dec. 11, 2001

(54) CAMERA HAVING LIGHT-BLOCKING LABEL

(75) Inventors: James D. Boyd, Rochester; Stephen J. Smith, Shortsville; Michael P. Cramer, Victor, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/360,909

(22) Filed: Jul. 26, 1999

(51) Int. Cl.$^7$ .................................................... G03B 17/02
(52) U.S. Cl. ................................................ 396/6; 396/535
(58) Field of Search .................................. 396/6, 535, 536, 396/537, 538

(56) References Cited

U.S. PATENT DOCUMENTS

| | | |
|---|---|---|
| 3,273,478 | 9/1966 | Kinder . |
| 4,540,265 | 9/1985 | Harvey . |
| 4,797,697 | 1/1989 | Heuer et al. . |
| 4,827,291 * | 5/1989 | Guez ..................................... 396/340 |
| 4,972,649 | 11/1990 | Mochida et al. . |
| 5,068,575 | 11/1991 | Dunsmore et al. . |
| 5,235,366 | 8/1993 | Kucmerowski . |
| 5,472,543 | 12/1995 | Yokajity . |
| 5,557,356 | 9/1996 | Ishida et al. . |
| 5,614,975 | 3/1997 | SanGregory et al. . |
| 5,652,930 | 7/1997 | Teremy et al. . |
| 5,761,542 | 6/1998 | Lamphron et al. . |
| 5,815,738 * | 9/1998 | Petruchik ................................ 396/6 |
| 5,873,002 | 2/1999 | Glanville, Sr. et al. . |

FOREIGN PATENT DOCUMENTS

| | | |
|---|---|---|
| 196 00 270 A1 | 1/1996 | (DE) . |
| 5134361 | 5/1993 | (JP) . |
| 7114147 | 5/1995 | (JP) . |
| 07205918 | 11/1995 | (JP) . |

* cited by examiner

Primary Examiner—David M. Gray
Assistant Examiner—Arthur A Smith
(74) Attorney, Agent, or Firm—Robert Luke Walker

(57) ABSTRACT

A camera has a casing enclosing a film area. The casing has a stray light path into the film area due to a light transmissive region, such as a region of translucent material. The light transmissive region can be bounded by an obstruction to label placement. A label is adhered to the casing. The label has an opaque portion covering the transmissive region. The label can be aligned with an obstruction boundary and spaced from the obstruction boundary by 0.8 mm or less.

26 Claims, 12 Drawing Sheets

CAMERA HAVING LIGHT-BLOCKING LABEL

CROSS REFERENCE TO RELATED APPLICATIONS

Reference is made to commonly assigned, co-pending U.S. patent application Ser. No. 09/360,432, entitled: CAMERA HAVING RESILIENTLY BIASING LABEL AND METHOD, filed Jul. 26, 1999 in the names of James D. Boyd, Stephen J. Smith, and Michael P. Cramer; Ser. No. 09/361,057, entitled: CAMERA HAVING LABEL MOUNTED ELECTRICAL COMPONENT, filed Jul. 26, 1999 in the names of James D. Boyd, Stephen J. Smith, and Michael P. Cramer; Ser. No. 09/360,576, entitled: METHOD FOR ASSEMBLING CRITICALLY POSITIONED CAMERA COMPONENT ON CAMERA BODY, filed Jul. 26, 1999, in the names of James D. Boyd, Stephen J. Smith, and Michael P. Cramer; Ser. No. 09/361,637, entitled: CAMERA HAVING LABEL INCLUDING OPTICAL COMPONENT, filed Jul. 26, 1999, in the names of James D. Boyd, Stephen J. Smith, and Michael P. Cramer; Ser. No. 09/360,908, entitled: ONE-TIME USE CAMERA HAVING BREAKABLE COMPONENT AND RECYCLING METHOD, filed Jul. 26, 1999, in the names of James D. Boyd, Stephen J. Smith, and Michael P. Cramer; Ser. No. 09/360,752, entitled: CAMERA HAVING LABEL-STOPPED OPTICAL SYSTEM, filed Jul. 26, 1999, in the names of James D. Boyd, Stephen J. Smith, and Michael P. Cramer; Ser. No. 09/361,056, entitled: ONE-TIME USE CAMERA LOADING METHOD, filed Jul. 26, 1999, in the names of James D. Boyd, Stephen J. Smith, and Michael P. Cramer each of which are assigned to the assignee of this application.

FIELD OF THE INVENTION

The invention relates to photography and to cameras and more particularly relates to a camera having a light-blocking label.

BACKGROUND OF THE INVENTION

The casing of a camera provides physical support for internal components and keeps out incidental light. Plastic casings were, at one time, very thick in order to provide adequate structural strength. Passage of incidental light through the material of the casing was not possible. In recent years, adequate strength has been provided by thin, injection-molded plastic casings. Dimensions of these casings can be reduced to the point that the composition of the plastic used must be highly opaque in order to adequately block light entry. Further reductions in dimensions or use of less opaque materials have not been warranted, since the resulting casing would have translucent regions.

One-time use cameras are widely available which include labels that describe use of the camera and have other useful or decorative information. U.S. Pat. No. 5,472,543 entitled "Method for Label Application Using Bernoulli Effect", which is hereby incorporated herein by reference, discloses a labeling method in which a label is floated on an air cushion into a substantially exact alignment with an area of an item receiving the label. It has been determined that the accuracy of the label placement provided by this method is very great.

It would thus be desirable to provide a camera having a light transmissive region, such as a region of translucent plastic, and a label precisely placed to block the passage of light through the transmissive region.

SUMMARY OF THE INVENTION

The invention is defined by the claims. The invention, in its broader aspects, provides a camera that has a casing enclosing a film area. The casing has a stray light path into the film area due to a light transmissive region, such as a region of translucent material. The light transmissive region can be bounded by an obstruction to label placement. A label is adhered to the casing. The label has an opaque portion covering the transmissive region. The label can be aligned with an obstruction boundary and spaced from the obstruction boundary by 0.6 mm or less.

It is an advantageous effect of at least some of the embodiments of the invention that a camera is provided that has a light transmissive region, such as a region of translucent plastic, and a label precisely placed to block the passage of light through the transmissive region.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 6 is semi-diagrammatical view of a first embodiment of the labeler head of the labeler of FIG. 5a.

DETAILED DESCRIPTION OF THE INVENTION

Figure 1:
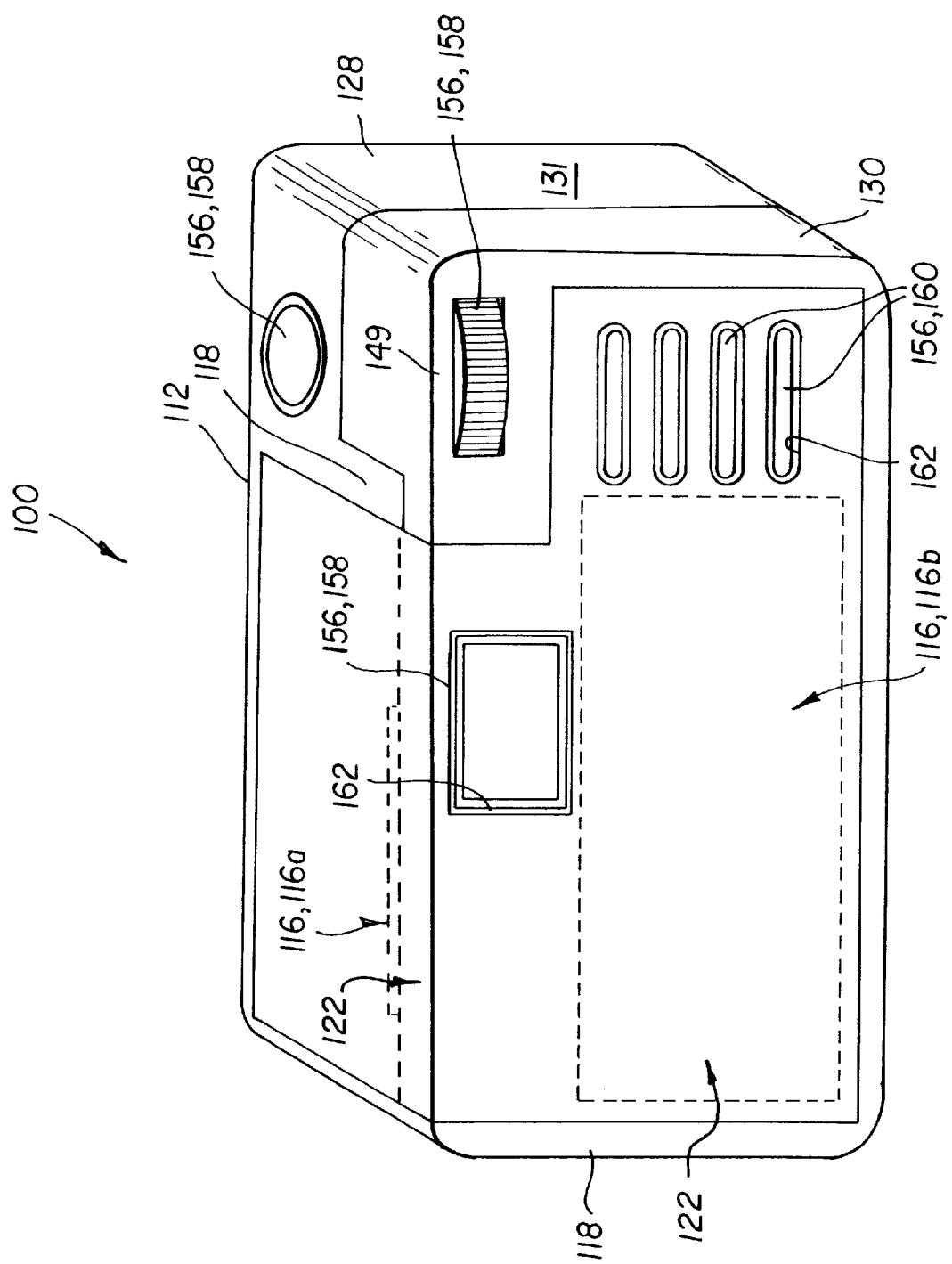
FIG. 1 is a perspective view of an embodiment of the camera. The position of light-transmissive regions of the body are indicated by dashed lines.

A camera 100 has a casing 112 that encloses a film area 114. The casing 112 has one or more light-transmissive regions 116 that define undesired stray light paths into the film area 114. The casing 112 also has opaque regions 118 that block admission of light into the film area 114. A label 120 is adhered to the casing 112. The label 120 has an opaque portion 122 that is superimposed on the light-transmissive region 116 and blocks transmission of light through the light-transmissive region 116 of the casing 112. The light-transmissive regions 116 can be holes or gaps 116*a* in the casing 112, but it is preferred that the light-transmissive regions 116 are solid parts of the casing 112.

Figure 2:
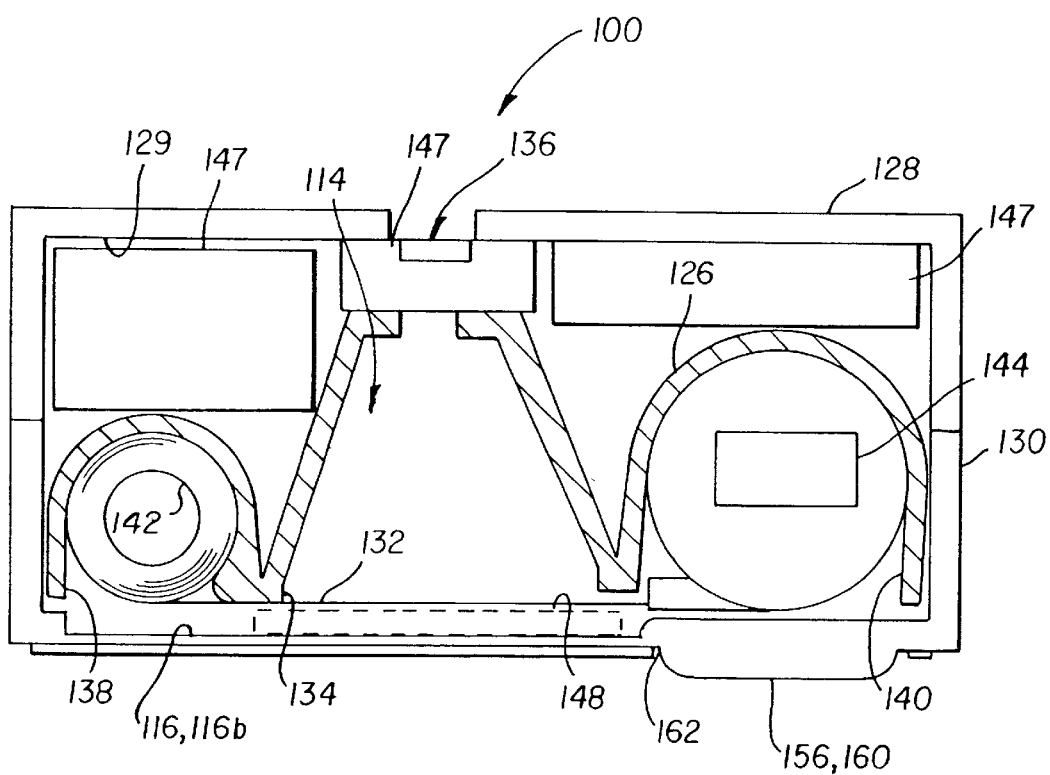
FIG. 2 is a semi-diagrammatical cross-sectional view of the camera of FIG. 1 taken substantially along line 2—2 in FIG. 1.

Referring now particularly to FIGS. 1–2, the casing 112 of the camera 100 includes a frame 126 and front and rear covers 128,130 joined over the frame 126. The casing 112 has interior and exterior surfaces 129,131. The invention is generally described herein in relation to a camera 100 having a single label 120 adhered to an exterior surface 131, but it will be understood that a label 120 can be on an interior surface 129 and multiple labels 120 can be used. A single label 120 mounted to an exterior surface 131 is preferred for ease of manufacturing.

The film area 114 includes an exposure chamber 134 to which light is directed by a taking lens 136 for picture taking. Within the casing 112, in the film area 114, unexposed film 132 is moved from a first film chamber 138, across the exposure chamber 134, to a second film chamber 140. The type of film and manner of film transport is not critical. For example, a one or two chamber film cartridge or a cartridge less film roll can be used. Film can be prewind and be returned to a film cartridge at the time of film exposure, or rewinding after exposure can be required. The embodiment illustrated in the figures is a one-time use camera 100, in which a film roll 142 housed in an otherwise empty film supply chamber 138, is moved by a film transport (indicated schematically by box 144) across the exposure chamber 134 to a film cartridge housed in a film cartridge chamber 140. The exposure chamber 134 is between the opposed film chambers 138, 140 and has a baffle through which light is admitted from the taking lens 136 when film exposures are made. The chambers 134,138,140 are parts of the frame 126. Joined to the frame 126 are various camera components 147 (illustrated by boxes in FIG. 2) that, together with the frame 126, comprise a frame assembly 146. Examples of such components include a viewfinder, a flash unit, an shutter mechanism, and the film transport 144. The components 147 include appropriate control features that extend through the casing 112. The shutter mechanism includes a shutter button. The film transport 144 includes a thumbwheel or advance lever. Suitable components and other features of the camera 100 that are not illustrated, are well known to those of skill in the art.

Referring now to FIG. 1, the light transmissive region 116 is an opening 116*a* between the front and rear covers 128,130, in which a screwdriver or other tool can be inserted when the camera 100 is opened for film processing. It is preferred that the camera 100 not have such openings that could admit light to the film area 114, since foreign objects could penetrate the label 120 at an opening and damage the interior of the camera 100 or allow light leakage. It is preferred that any and all light-transmissive regions 116 of the casing 112 be free of openings 116*a*. Preferred light-transmissive regions 116 of the casing 112 are regions 116*b* of solid translucent plastic. The term "translucent" is used herein in a technical sense, to describe a medium which transmits rays of light so diffused that objects cannot be seen distinctly. Even when thin, plastics used for one-time use camera bodies, such as polystyrene, are tough and resistant to bending, stretching, and punctures. Labels 120 are thinner and less resistant to such deformation. It is preferred for convenience in production that the label 120 is very thin relative to the casing 112 and compliant, but resistant to punctures. An example of a suitable label 120 material is a polymeric blend of polystyrene and polyethylene. Even if abused, such a label 120 is unlikely to admit light and spoil the film 132. There is a risk, however, that an intruding object could bend the label 120 and cause pressure marks on the film 132. This risk is not present when the only transmissive regions 116 on a camera 100 are regions 116*b* of solid, translucent plastic.

Single or multiple light-transmissive regions 116 can be present on the casing 112. All of the light-transmissive regions 116 can be covered by a single label 120 or multiple labels 120 can be used. For convenience, the invention is generally discussed herein in relation to a camera 100 having a single translucent region 116*b* covered by a single label 120.

Referring again to FIGS. 1–2, the rear cover 130 includes translucent region 116*b* and opaque regions 118. The opaque regions 118 do not allow light to pass through. The translucent region 116*b* is thinner than the opaque regions 118 and is continuous with the opaque regions 118. The cover portions 128,130 are each preferably a one-piece plastic casting produced by injection molding or the like. The translucent region 116*b* can differ in opacity from the opaque regions 118 on the basis of a difference in composition rather than a difference in thickness; but this is not preferred, since this approach does not provide an advantage of reduced size.

The rear cover 130 closes the chambers 134,138,140. The rear cover 130 of the camera 100 is preferably a one-piece plastic casting produced by injection molding or similar process. The rear cover 130 is composed of a material that has a uniform opacity per unit volume, but the part of the rear cover 130 that forms the translucent region 16*b* is sufficiently thin as to be translucent and transmit light. The rear cover 130 can be neutral in color or can have a hue, in which case, the transmitted light will be colored. Opaque regions 118 and translucent regions 116*b* are continuous with each other, but the translucent regions 116*b* are thinner. The translucent region 116*b* is shown as overlapping the exposure chamber 134 and film supply chamber 138. Without the label 120, light can pass through the translucent region 116*b* and strike the film 132 within the exposure chamber 134 and/or the film chambers 128,130. The translucent region 116*b* can be of different sizes and in different positions as required by a particular camera 100 design. In the camera 100 design shown, the reduced thickness at the translucent region 116*b* decreases contact of the film 132 with the back cover 130. To keep the film 132 positioned in a flat or curved film plane appropriate for a particular lens system, the back cover 130 can have one or more longitudinal ribs or other protrusions. (Ribs are illustrated in FIG. 2 by a dashed line 148.) The ribs or protrusions act as a platen for the film 132 in the exposure chamber 134. The back cover 130 can be convoluted to provide the ribs. In that case the ribs can be translucent. Alternatively, the ribs can be provided as an array of thickened opaque regions 118 interposed in an interrupted translucent region 116*b*.

Figure 3:
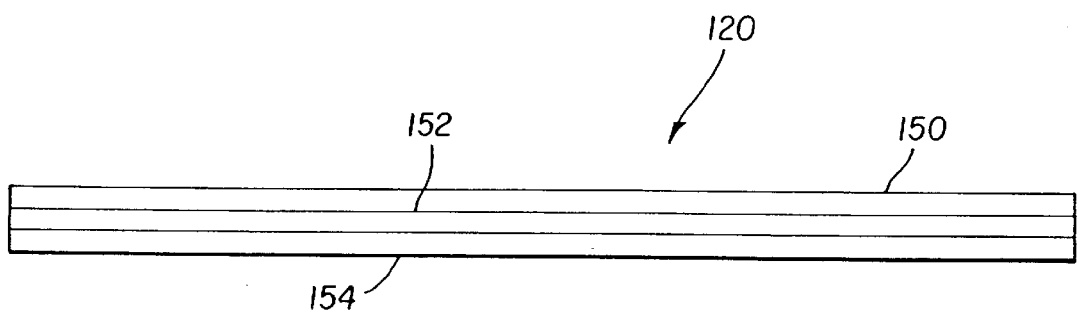
FIG. 3 is a semi-diagrammatical cross-sectional view of the label of FIG. 1.

The label 120 is adhered to the casing 112. In the embodiment shown in the figures, the label 120 is adhered to the rear cover 130 and to the front cover 128. The label 120 is shown folded over an edge 149. The label 120 is preferably compliant to allow such folding without creasing and to allow easy placement on curved surfaces. The opaque portion 122 of the label 120 covers the translucent region 116*b*. The opacity of the label 120 can be provided in a variety of different ways. Referring to FIG. 3, a convenient way of providing opacity is the use of a multiple layer label 120, in which one of the layers is metallized plastic or metallic foil. In FIG. 3 an adhesive layer 150 is bonded to a layer 152 of foil or metallized plastic, to which is bonded a layer 154 of printable material such as paper or printable plastic. Such labels are inexpensive and are well known to those of skill in the art.

The opaque portion 122 of the label 120 can encompass the entire label or can be limited to only the part of the label 120 overlying the translucent portion 116b of the casing 112. This is largely a matter of artistic design. For example, if the casing 112 of the camera 100 is colored, the label 120 can have one or more transparent areas to shown the color of the casing 112.

The camera 100 has obstructions 156 that extend inward or outward relative to the rest of the camera casing 112 or otherwise present a discontinuity or obstruction 156 in the casing 112. The obstructions 156 cannot be covered by label 120 without degradation of the function or appearance of the camera or both. In some embodiments such as the one shown in FIG. 1, covering the obstructions 156 partially or completely with the label 120 would also present a risk of light leakage to the translucent region 116b of the casing 112. Many obstructions 156 are control elements 158; such as the viewfinder, the thumbwheel, and the shutter button shown in FIG. 1; that must be accessible to the user for picture taking. (A control element 158 is considered an obstructions 156, if it must remain uncovered or presents sufficient surface relief to hinder label placement.) Other obstructions 156, such as the grip elements 160 shown in FIG. 1 could receive a label 120; but not without degradation of function. The grip elements 160 are small structures that help the user hold the camera 100. Still other obstructions (not shown) are interference features that abruptly change camera contours and for that reason cannot be cleanly labeled. In following discussion of FIGS. 1 and 2, the viewfinder and grip elements 160 are the only obstructions 156 discussed, since the other obstructions 156 are spaced from the label 120.

Adjoining the obstructions 156 are obstruction boundaries 162, parts of the casing 112 that define limits of the area that can be covered by a label 120. On the casing 112, the obstruction boundaries 162 define limits of the area that can receive a label 120. It is highly preferred that obstruction boundaries 162 of the casing 112 are part of an opaque region 118 rather than the translucent region 116b. Obstruction boundaries 162 on the translucent region 116b present a risk of light piping. The obstruction boundaries 162 receive the label 120, without deleterious effect. Depending upon the position of the obstruction 156 on the camera casing 112, the obstruction boundary 162 can surround all or part of the obstruction 156.

The label 120 is adhered to the casing 112 in registration with the obstruction boundaries 162. For any obstruction 156 adjoining the label 120, edges of the label 120 overlap and are coextensive with obstruction boundaries 162 for that obstruction 156. This assures good contact of the label 120 with the casing 112. As a result, the translucent region can closely adjoin an obstruction 156, yet still be rendered opaque by the label 120. The obstruction boundary 162 can be covered by an outer edge of the label 120, as is the case in FIG. 1, with the obstruction boundary 162a around the viewfinder. Alternatively, the obstruction boundary 162 can be covered by an inner edge of the label 120, as is the case in FIG. 1 with the obstruction boundaries 162 around each of the grip elements 160.

With an obstructed casing 112, it is preferred that the label 120 is adhered to the casing 112 in registration with the obstruction boundaries 162 such that the label 120 is aligned with the translucent region and the obstruction boundary 162 translationally is within 0.6 mm, that is, the tolerance for the location for each edge of the label 120 is ±0.3 mm. It is more preferred that the obstruction boundary 162 translationally is within 0.4 mm of the label edge (a tolerance of ±0.2 mm) and still more preferred within 0.2 mm (a tolerance of ±0.1). This precise positioning of the label 120 protects against light leakage through the transmissive region 116, despite close placement of the transmissive region 116 and the obstruction boundaries 162.

Figure 4:
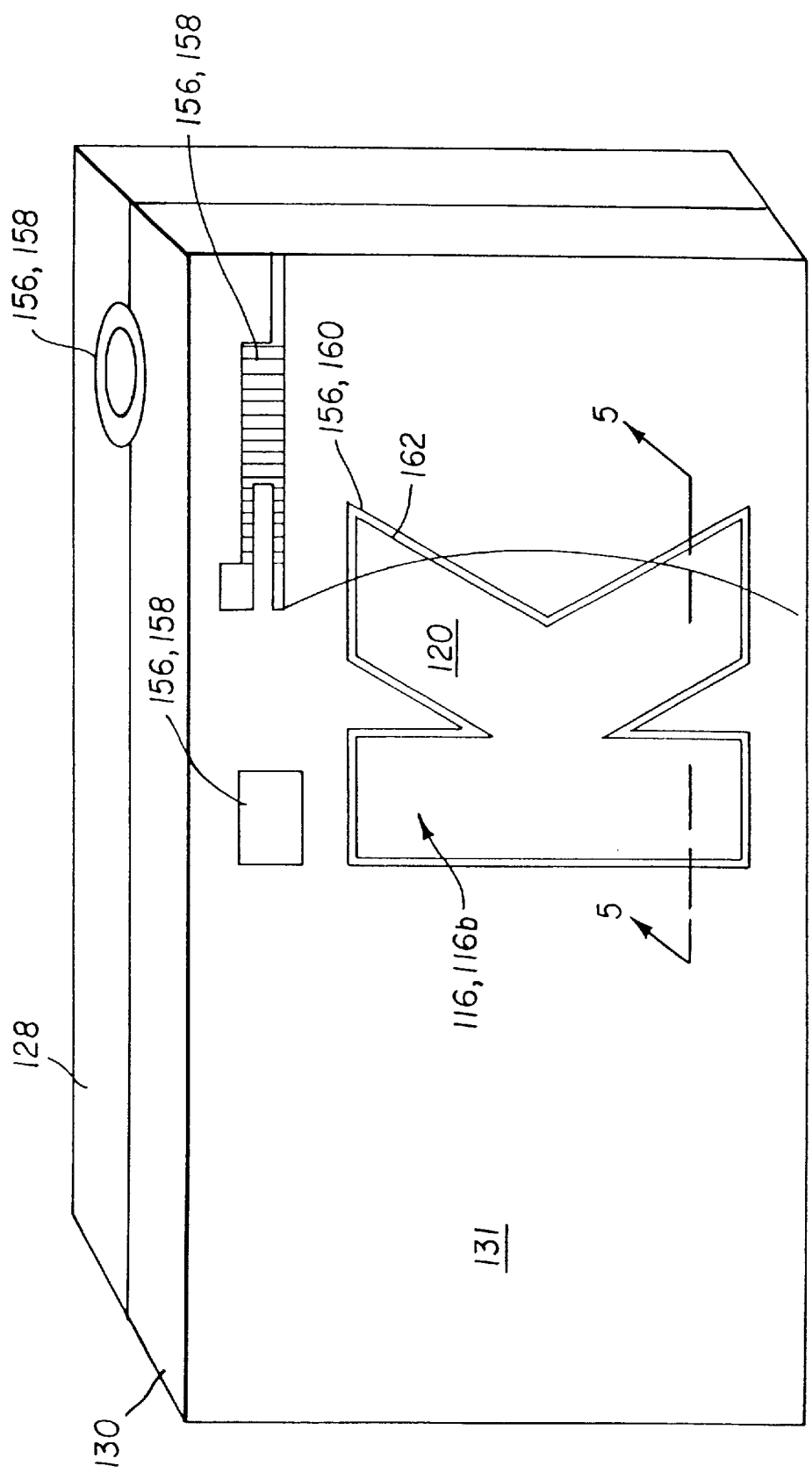
FIG. 4 is a semi-diagrammatical rear view of another embodiment of the camera.
Figure 5:
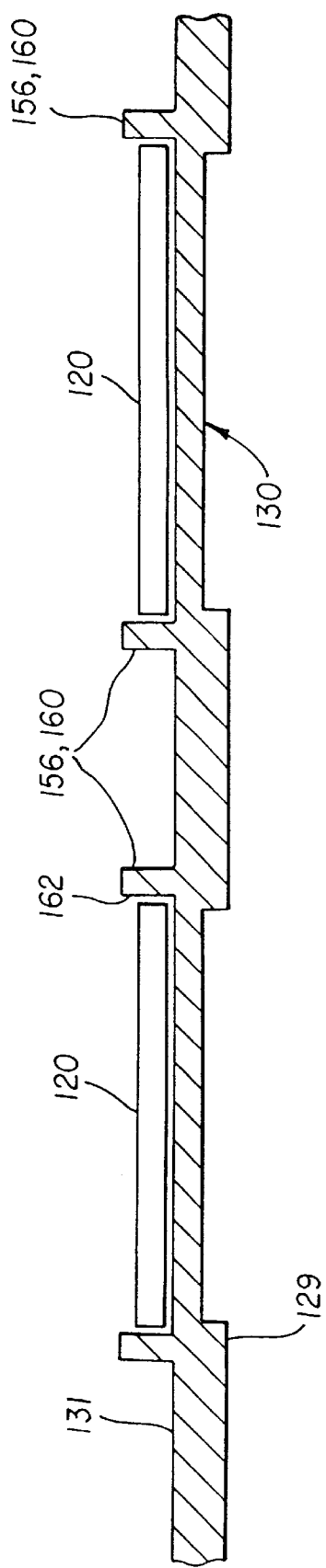
FIG. 5 is a cross-sectional view of the camera of FIG. 4 taken substantially along line 5—5 of FIG. 4.
Figure 5A:
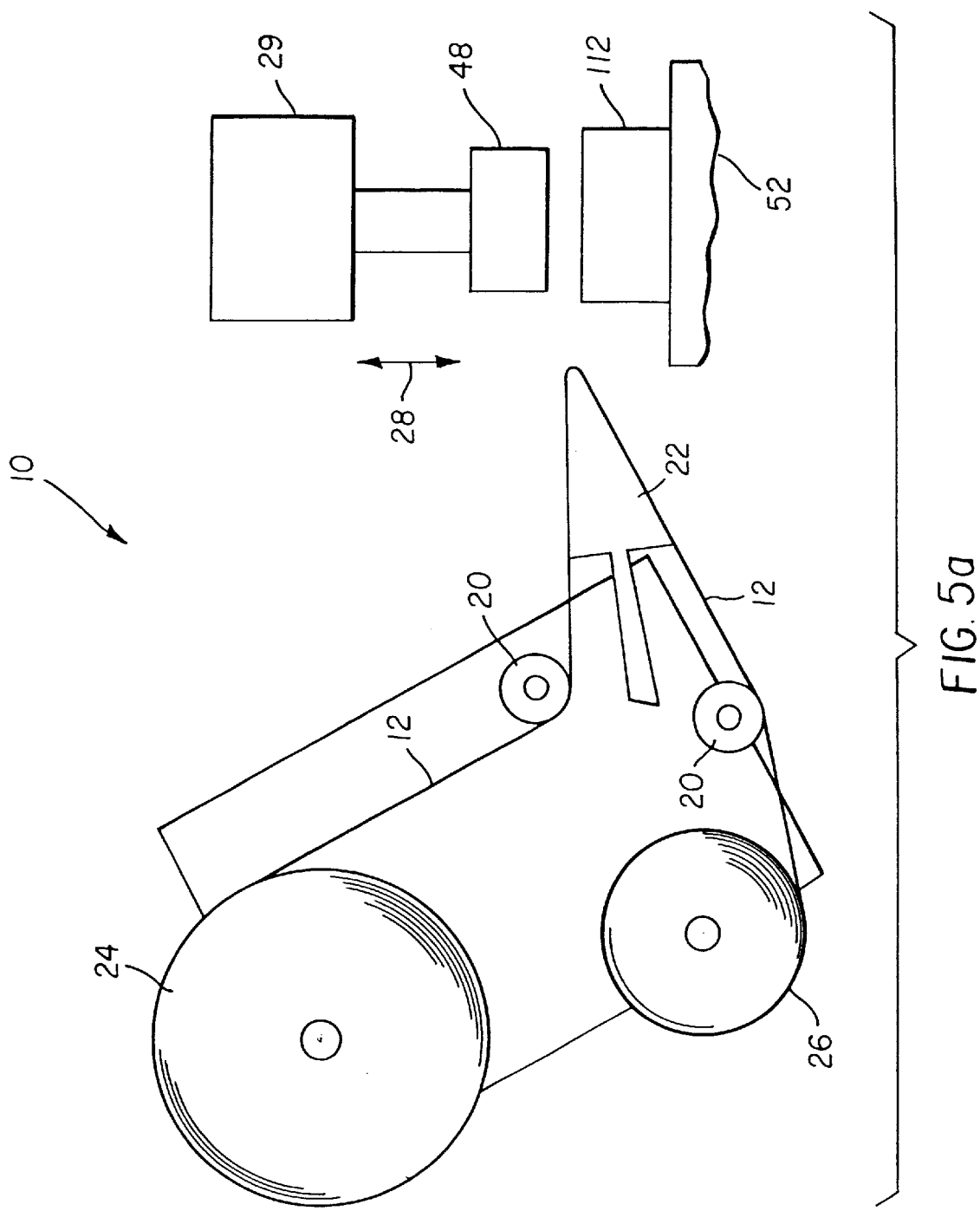
FIG. 5a is a semi-diagrammatical view of an embodiment of a Bernoulli labeler.
Figure 7:
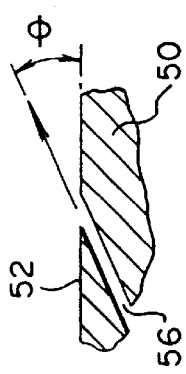
FIG. 7 is a fragmentary sectional view of the labeler head of FIG. 6, indicating the orientation of the bores for the gas jets.

The obstruction boundary 162 can border the transmissive region 116 on one or more sides and can even surround the transmissive region 116. Referring now particularly to FIGS. 4–5, The obstruction 156 is a grip element 160 in the shape of an indicia, shown in FIGS. 4–5 as the letter "K".

Referring now to FIGS. 5a–21, the labels 120 can be attached within 0.6 mm of obstruction boundaries 162 using the Bernoulli effect labeler heads 48, labeling apparatus 10, and methods disclosed in U.S. Pat. No. 5,472,543. Separations of 0.4 mm or less and 0.2 mm or less can be provided by careful tolerancing of all manufacturing components or by culling of cameras with the greatest variance, or both. The labeler head 48 comprises a main member 50 having a support surface 52 which may be flat, or convex and substantially cylindrical with an axis of curvature. A plenum 54 within the main member 50 communicates with a plurality of bores 56 extending from the plenum 54 through the support surface 52. The bores 56 are angled with respect to the support surface 52 and arranged in an array so that jets of gas issuing from the array will cause a label 120 to be drawn onto the support surface 52 when the label 120 is presented to the support surface 52 and a first side of the label 120 is brought into close proximity of the jets, thereby causing a zone of reduced gas pressure to be formed between the support surface and the first side of the label and establishing a pressure differential across the label 120 to hold the label 120 on a film of gas flowing over the support surface 52. A gas supply (not shown) provides a flow of gas into the plenum 54 and through the angled bores 56. The gas supply provides pulses of higher pressure gas to propel labels 120 against the camera casing 112 to be labeled and can provide a vacuum to the labeler head 48 as necessary to hold label 120.

In the apparatus 10, an elongated carrier strip 12 has a surface having low affinity for the adhesive-backed side of a plurality of pressure-sensitive labels 120. Display sides of the labels face outward from the carrier strip 12. Labels 120 can be of practically any shape and are moderately stiff, to facilitate ready removal from the carrier strip 12. The carrier strip is wound in a large roll 24 prior to label removal. The used carrier strip 12, depleted of labels 120, is likewise wound in a roll 26. The rolls 24,26 are mounted to the apparatus 10 for rotation such that strip 12 is pulled around an idler roller 20 and then around the edge of a peeler plate 22. Because the adhesive backing on labels 120 has a low affinity for the surface of strip 12 and because labels 120 have a certain resistance to bending, the labels release gradually and automatically from strip 12 as the strip passes around the edge of the peeler plate 22 and are presented substantially tangentially to the labeler head 48. The labeler head 48 is reciprocated in directions indicated by double-headed arrow 28 by a drive 29. The casing 112 is supported on a bracing or conveyor 30. A nest can be used to support the casing 112.

The main member 50 of the labeler head 48 is a material such as metal or rigid plastic or a resilient material. The support surface 52 is smooth and typically flat. Within main member 50, a plenum 54 communicates with a plurality of bores 56 which extend from plenum 54 to support surface 52. In a particular embodiment of the invention, bores 56 have a diameter in the range of 0.012 to 0.032 inch (0.030 to 0.081 cm) and are set at an angle to support surface 52 in the range of 5 to 45 degrees. A port 58 is provided through main member 50 to connect plenum 54 to the gas supply to provide pressurized air or subatmospheric pressure. Bores 56 are arranged in an array so that jets of gas issuing from the bores will cause label 120 to be drawn onto support surface 52 when the label 120 is presented to the support surface and its display side is brought into close proximity with the jets of gas. The flow of gas causes a zone of reduced gas pressure to be formed between support surface 52 and label 120, in accordance with the Bernoulli Effect, thereby establishing a pressure differential across the label 120 to hold the label 120 in position on a film of gas flowing over the support surface. The array is also configured so that, once released, label 120 will move relative to support surface 52 and reposition itself accurately against one or more stops 60 provided on or adjacent the support surface. Just as shown in FIGS. 6, and 13–21, with the labeler head of FIGS. 6 to 9, label 120 covers the portion of the array of bores 56 which are at least partially directed toward stops 60, when the label 120 is positioned against the stops. Thus, the rear or upstream edge of the label 120 is not subjected to air flows which could dislodge it from its position against the stops. Stops 60 can be supported on resilient springs 61, which allow the stops to be depressed to the level of support surface 52 during label 120 application. Preferably, stops 60 are made from a material to which the adhesive of the labels 120 will not stick readily, such as Rulon, a plastic material made by Dixon Industries Corp. of Bristol, R.I. U.S.A.

Figure 8:
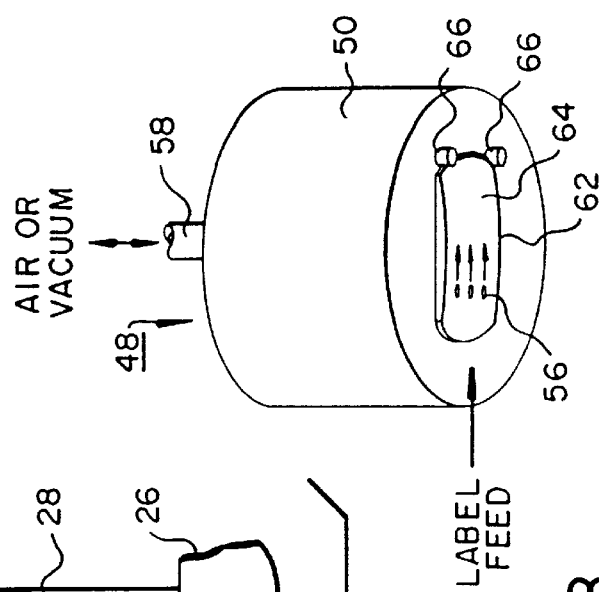
FIG. 8 is a perspective view of a second embodiment of the labeler head.
Figure 6:
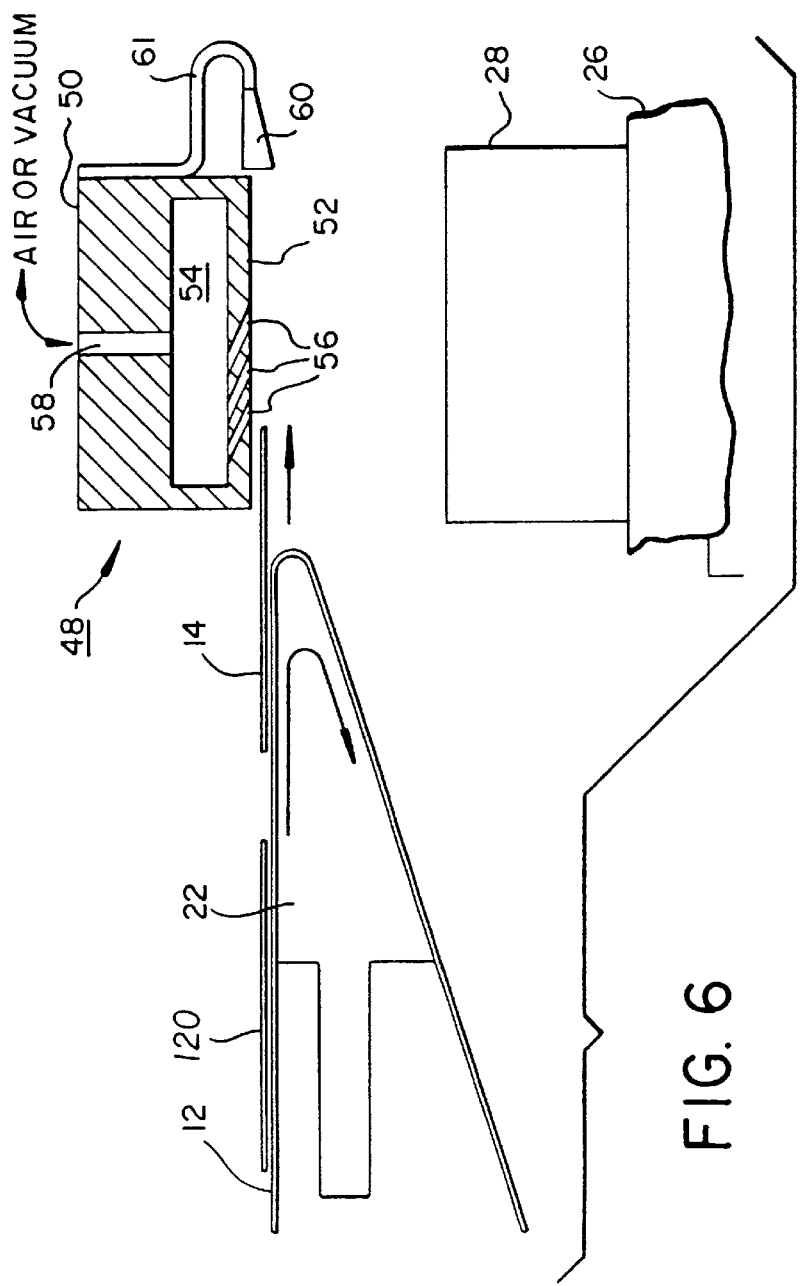
Figure 9:
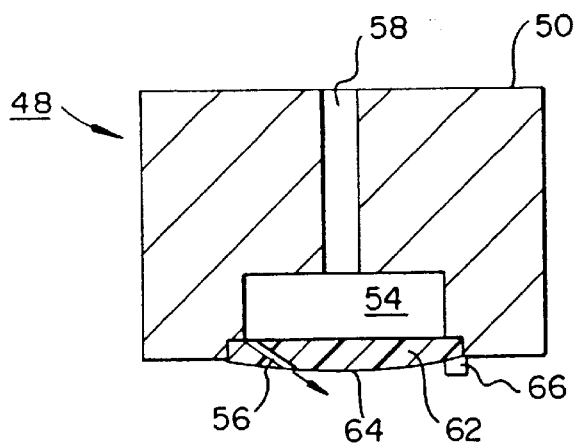
FIG. 9 is an elevation section view through the labeler head of FIG. 8.

FIGS. 8–9 illustrate another labeler head 48 useful with the apparatus 10, in which flat support surface 52 is replaced by a resilient insert 62 of a material such as silicon rubber which has cylindrical, convex support surface 64 having an axis of curvature transverse to the direction from which label 120 is fed to labeler head 48. A pair of stop pins or abutments 66 are provided on one side of support surface 64. Stop pins 66 preferably also are made from a non-stick material such as Rulon. In a particular embodiment, at least a portion of bores 56 are angled so that their jets of gas are directed at least partially toward stop pins 66 and do not oppose movement of label 120 onto the labeler head. By "at least partially toward" is meant that none of the air jets includes a vector component which would oppose movement of the label 120 across support surface 64. For round labels 120, the jets from bores 56 preferably are symmetrically placed on either side of the path of the label 120 onto the labeler head. Round labels 120 upon release will move across support surface 64 into accurate engagement with stop pins 66. The label 120 may be provided with a radially inwardly or outwardly extending feature which is engaged by the stop pins 66. The label 120 may have a central aperture; and the main member 50 may have a locator pin (not illustrated in this embodiment) positioned centrally of the array, the pin being sized to pass through the aperture of the label 120 and preferably being retractable. Non-symmetric arrays of bores are also useful, for example, with rectangular labels 120. The resilient material of insert 62 and the cylindrical shape of support surface 64 ensure that when the labeler head is pressed against a casing 112 to apply label 120, essentially line contact is first established due to the cylindrical shape and then the insert compresses, so that the label 120 is smoothly applied without bubbles or wrinkles.

Figure 10:
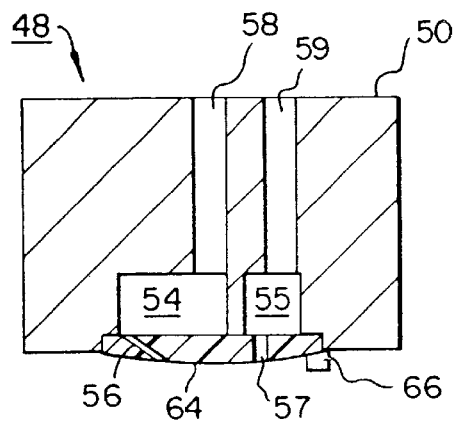
FIG. 10 is an elevation view of a third embodiment of the labeler head.

FIG. 10 shows a modification of the labeler head of FIGS. 8–9. Within main member 50, a second plenum 55 communicates with one or more bores 57 which extend from plenum 55 to support surface 64. Such a second plenum 55 and bores 57 also may be included in the other labeler heads discussed. A port 59 is provided from plenum 55 to a source of pressurized air; so that, a blast of air through bores 57 may be used to blow the label 120 onto the casing 112 to be labeled.

Figure 11:
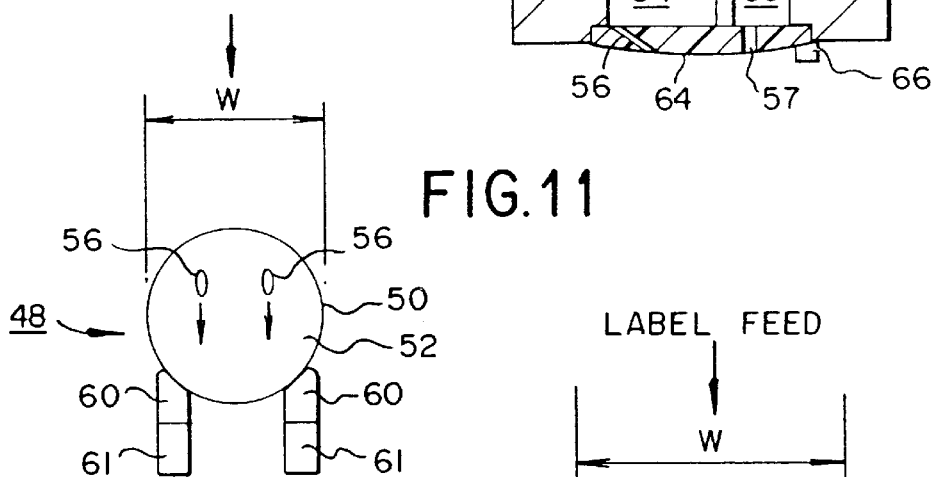
FIGS. 11–12 are plan views of modifications of the labeler heads of FIGS. 6–10.
Figure 12:
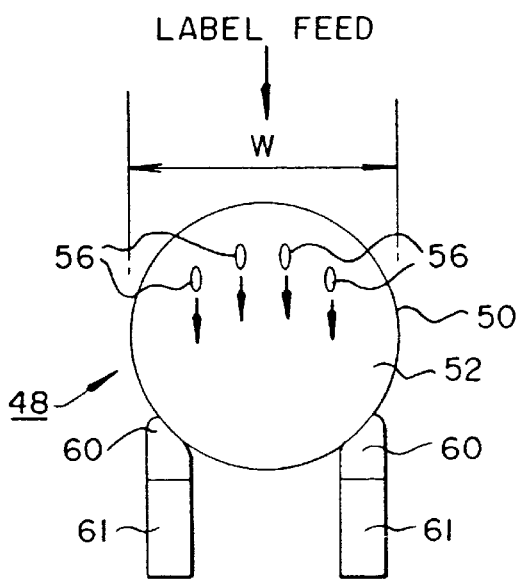
Figure 13:
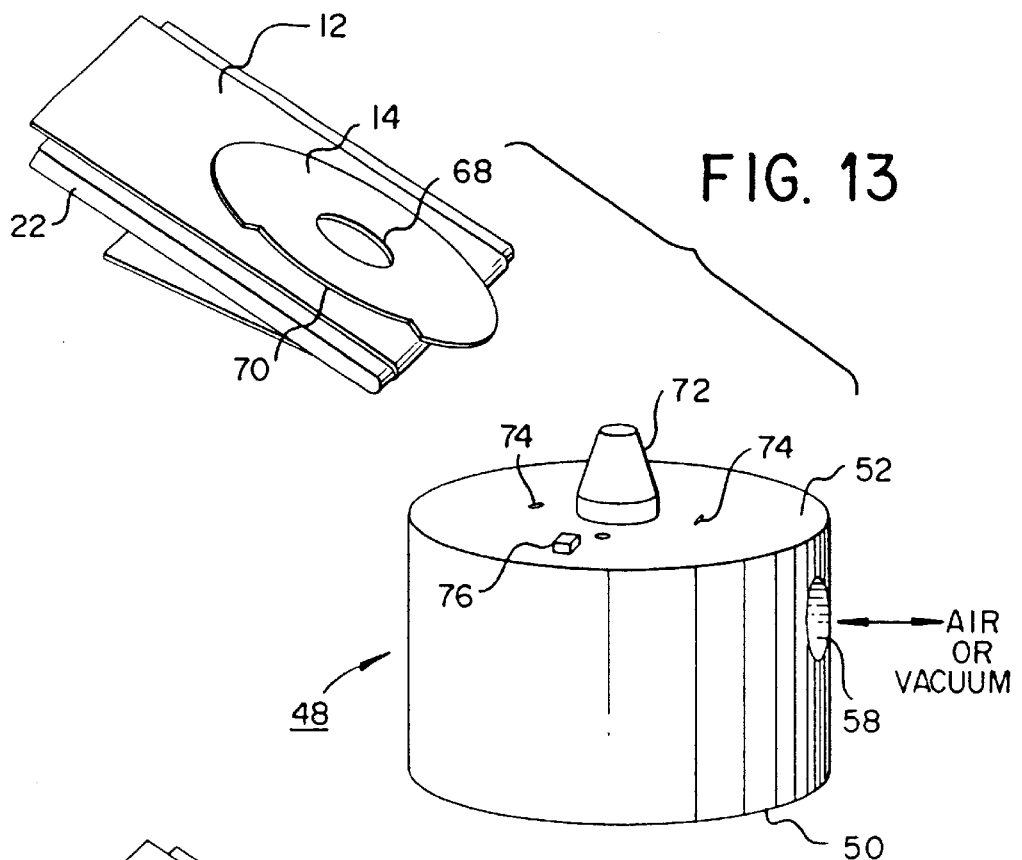
FIGS. 13–16 are perspective views, some in section, of a fourth embodiment of the labeler head.
Figure 14:
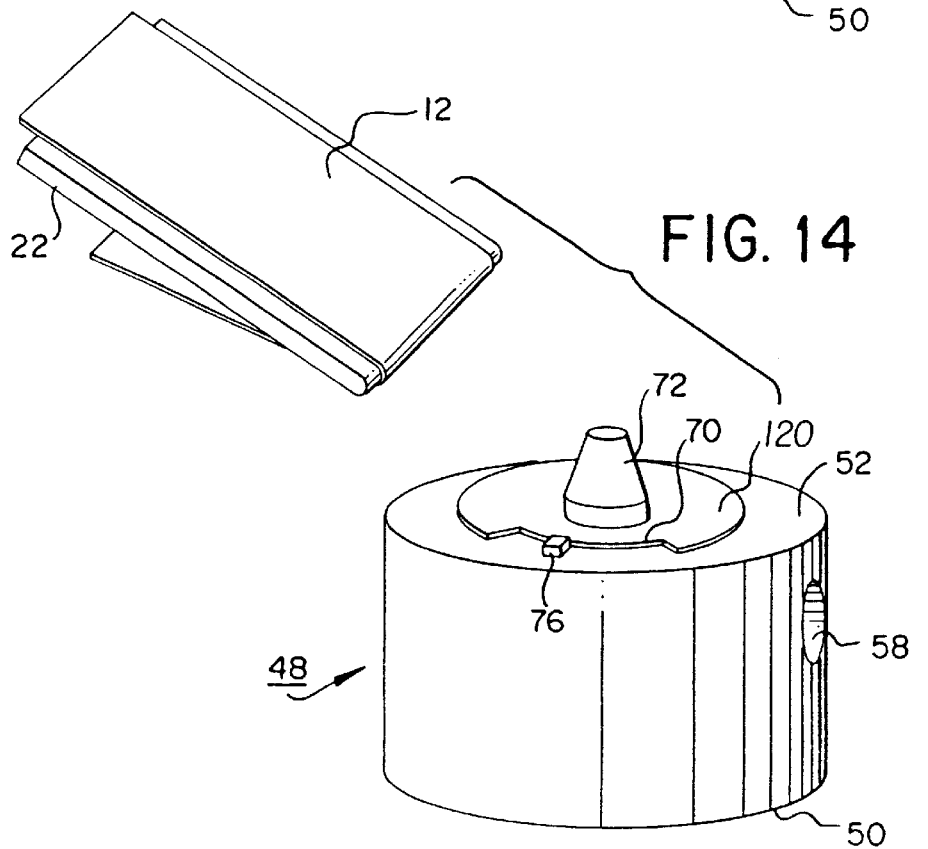
Figure 15:
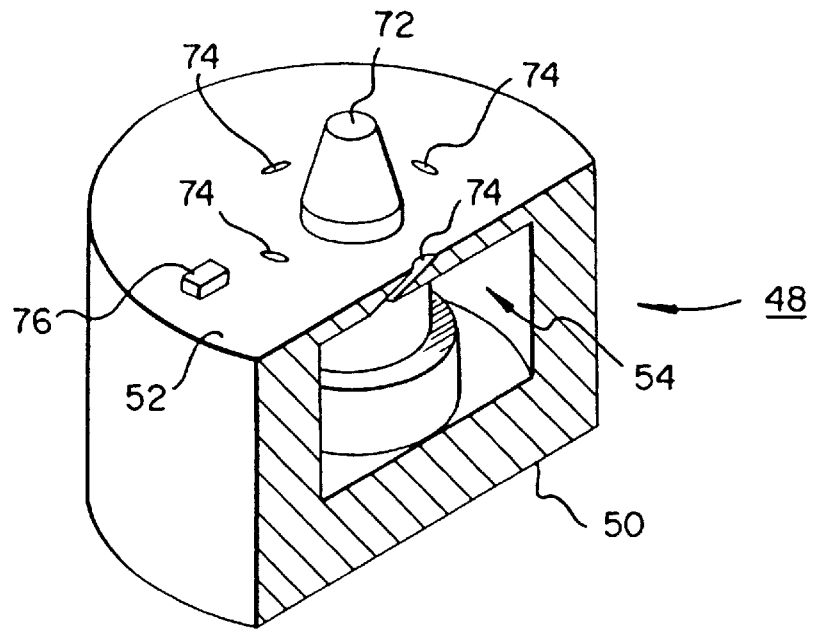

FIGS. 11–12 illustrate typical arrays of bores 56 for labeler heads 48 of FIGS. 6–10, having flat support surfaces 52 approximately 0.6 and 1.0 inch (1.52 and 2.54 cm), respectively, in width ("W" in FIGS. 14–15). The number of bores depends upon the area and weight of the label 120. The arrows indicate the direction of the jets from bores 56 toward stops 60, preferably so that no vector component of any jet will oppose movement of label 120 onto support surface 52. For round labels 120, the jets preferably are symmetrically placed relative to the path of the label 120. Thus, round labels 120 upon release will move across support surface 52 into accurate engagement with stops 60. Similar arrays of bores may be used for labels 120 of other shapes.

Figure 16:
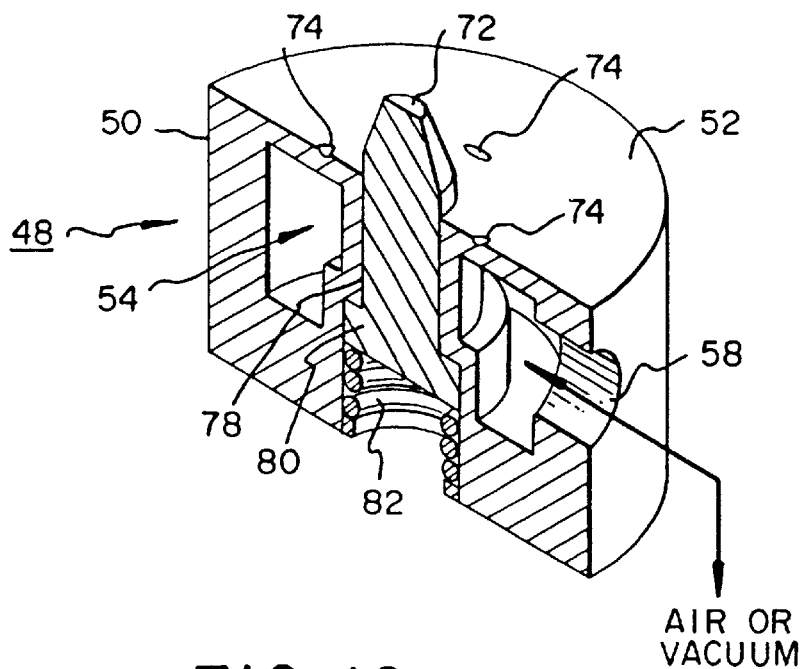
Figure 17:
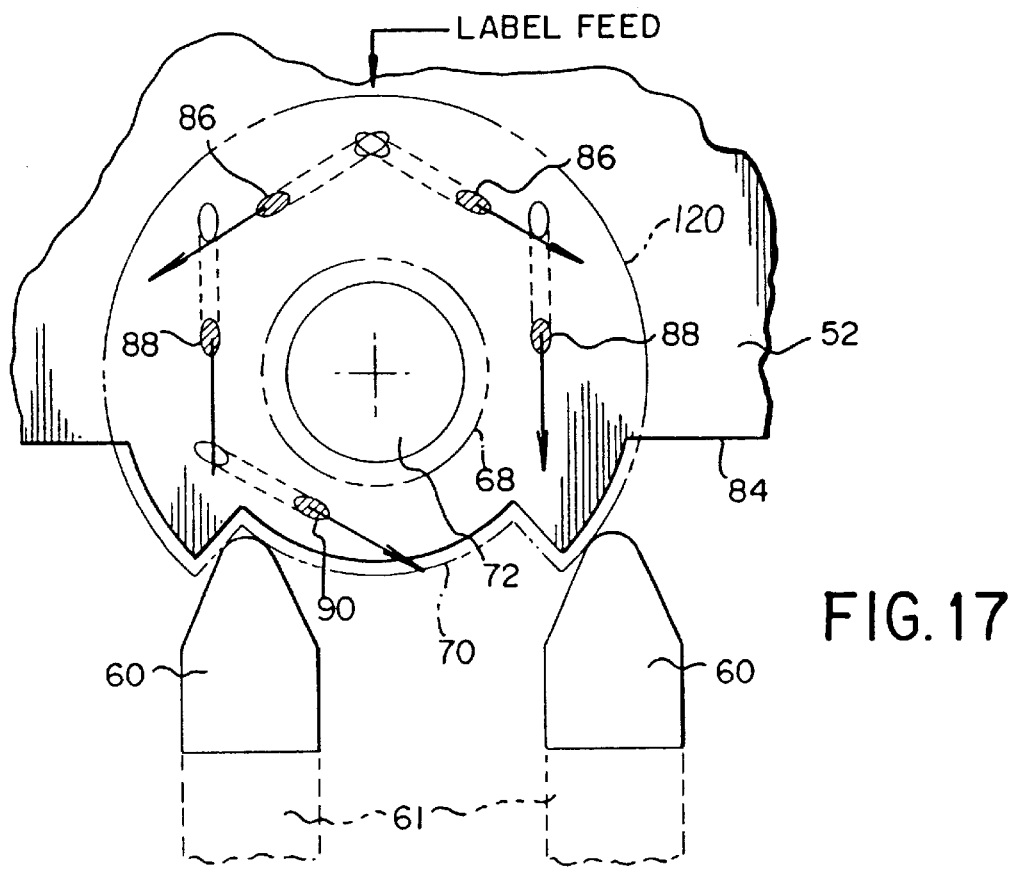
FIG. 17 is a plan view.
Figure 18:
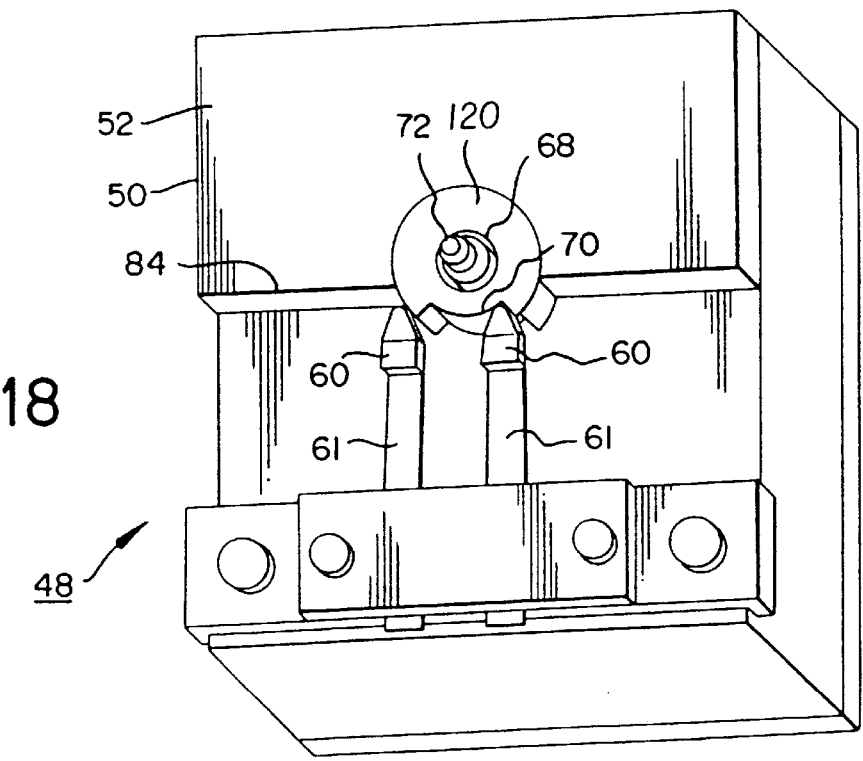
FIGS. 18–21 are perspective views, some in section, of a fifth embodiment of the labeler head.
Figure 19:
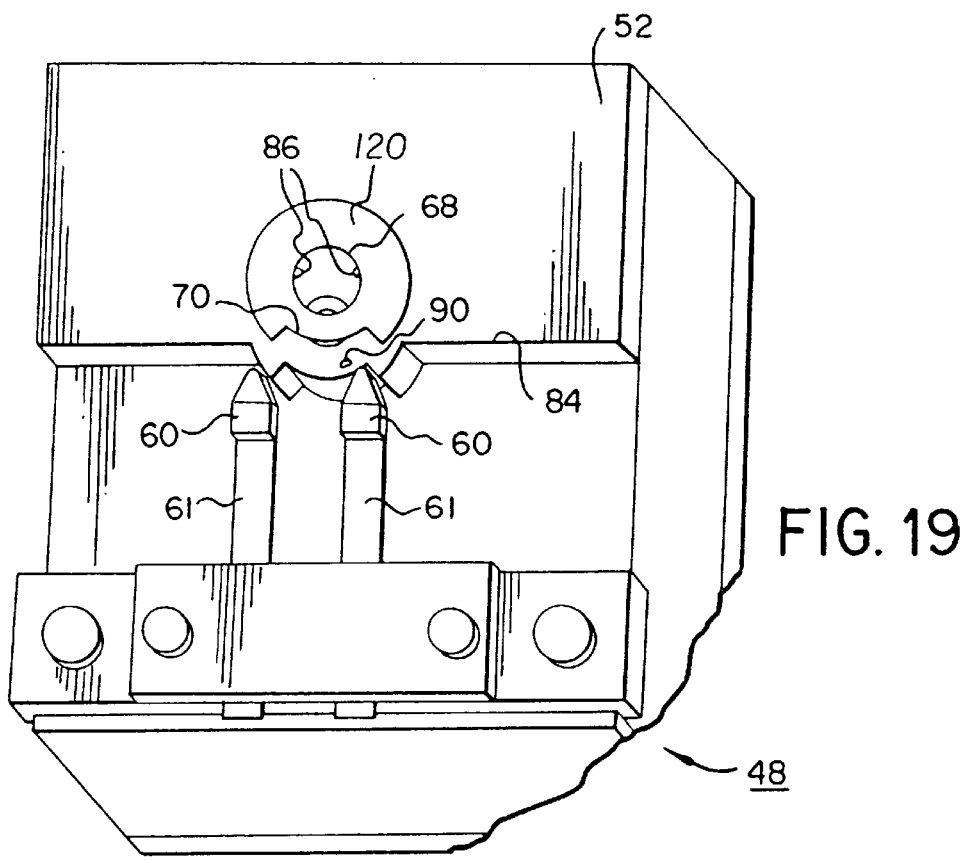

FIGS. 13–16 illustrate another labeler head 48 which is suited for applying labels 120 having a central hole 108 and a radially inwardly extending feature such as a notch 70 extending over an arc of the circumference of the label 120. In this case, main member 50 is provided with a centrally positioned, tapered locator pin 72 which extends from support surface 52. The diameter of locator pin 72 preferably is only slightly smaller than that of central hole 108, to accurately center the label 120 on the labeler head 48. Surrounding locator pin 72 is an array of angled bores 74 whose jets extend in generally the same sense or circular direction about locator pin 72. When label 120 is released so that locator pin 72 enters hole 108, the label 120 will move down onto and spin around locator pin 72 until notch 70 settles over an axially extending stop or abutment 76, thereby stopping movement of the label 120 and accurately centering and angularly positioning it for application. As shown in FIG. 16, label 120 covers the portion of the array of bores 74 which are at least partially directed toward stop 76, when the label 120 is positioned against the stop. Thus, the circumferential edge of the label 120 is not subjected to air flows which could dislodge it from its position against the stop. Preferably abutment 76 is retractable during application of the label 120, (not illustrated). As shown in FIGS. 15–16, main member 50 has a central stepped passage, which is surrounded by plenum 54, and in which locator pin 72 is slidably mounted. A head 80 on the locator pin is pressed against by a spring 82; so that, locator pin 72 is retractable but is biased to extend beyond support surface 52 as illustrated. As will be discussed further with respect to FIG. 20, the retractability of locator pin 72 facilitates use of labeler head 48 to accurately place label 120 around an opening 122 in the casing 112 to be labeled. Subatmospheric pressure can be applied to plenum 54 after the label 120 has been acquired and repositioned.

Figure 20:
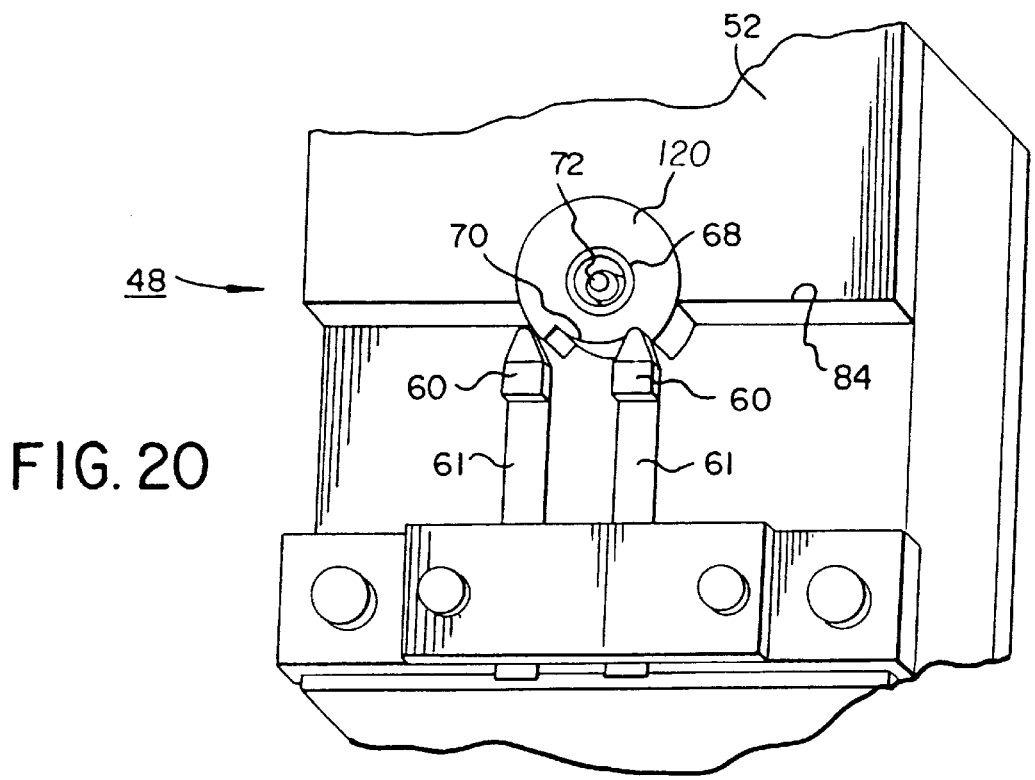
Figure 21:
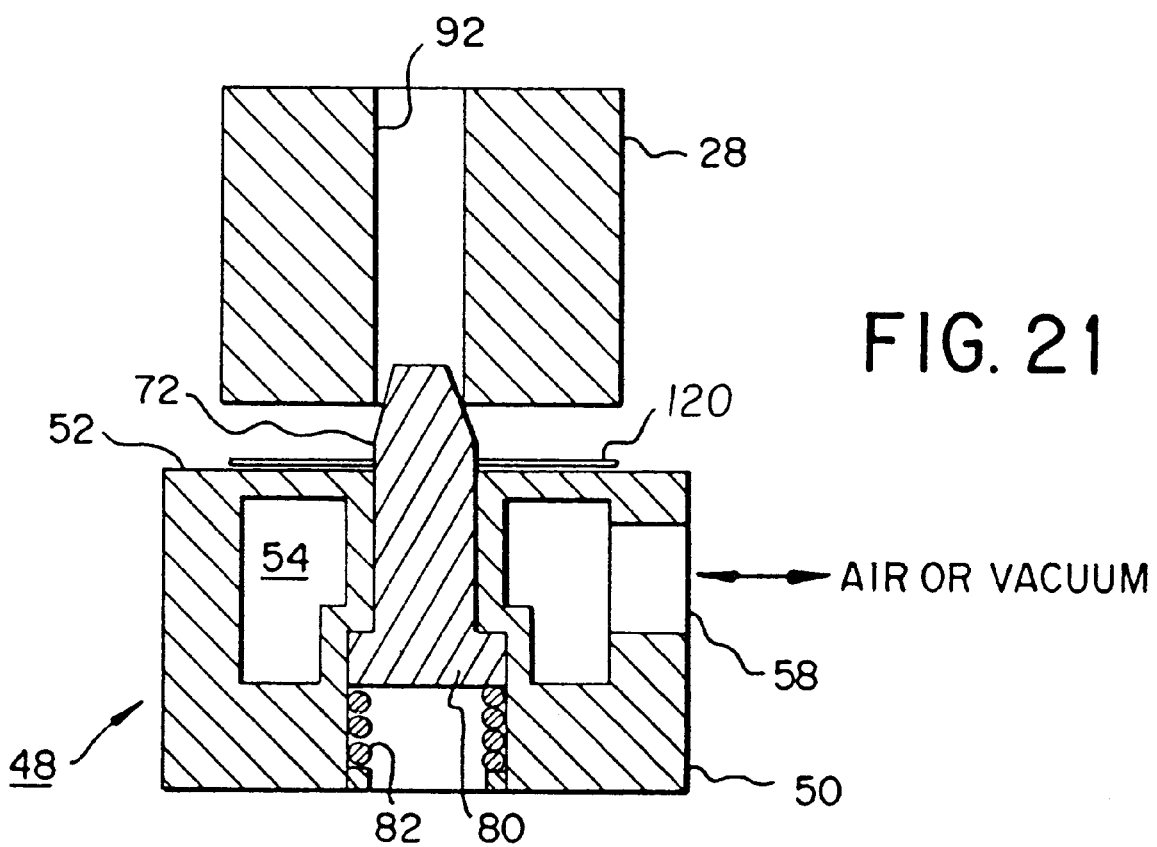

FIGS. 17–21 illustrate another labeler head 48 which also is particularly suited for applying labels 120 having a central hole 108 and a peripheral notch 70. In this instance, locator pin 72 can be withdrawn below support surface 52 by any convenient means such as a solenoid or air cylinder (not illustrated), to permit label 120 to be presented and accurately positioned in a different manner. Thus, the diameter of locator pin 72 can be substantially less than that of hole 108. To facilitate adjustment of the lateral positions of stops 60 and to allow the stops to be depressed to the level of support surface 52, support surface 52 preferably ends at a recess having an edge 84 which along a portion of its length is shaped geometrically similarly to the portion of label 120 comprising notch 70. Opposite this portion of edge 84 and extended over the recess are stops 60, laterally positioned so that the first stop can engage one side of notch 70 and the second stop can engage the periphery of label 120 on the opposite side of notch 70 from the first stop, as seen most clearly in FIGS. 20 and 23. The label 120 is presented to support surface 52 along a path directly toward stops 60. Rather than the circular array of bores of the embodiment of FIGS. 16–19, a first pair of bores 86 are provided on the opposite side of locator pin 72 from stops 60 and are directed at angles toward opposite sides of locator pin 72; a second pair of bores 88 are directed directly toward stops 60 on opposite sides of locator pin 72; and a single, angular orientation bore 90 nearest stops 60 is directed at an angle toward the more distant of stops 60. Bore 90 may be positioned on either side of the path of label 120. In a particular embodiment, none of the jets includes a vector force component which would oppose movement of the label 120 across support surface 52. Support surface 52 preferably is flat but also may have a cylindrical, convex shape of the type shown in FIGS. 8–9. With this arrangement, once locator pin 72 has been withdrawn, a label 120 presented in the direction shown will be moved by jets 86, 88 across support surface 52 toward stops 60 and will be turned by jet 90; so that, stops 60 accurately engage notch 70 and the periphery of the label 120. Locator pin 72 can then be extended through central hole 108. As shown in FIGS. 20 and 23, in the embodiment of FIGS. 17–21 label 120 covers the portion of the array of bores 86, 88, 90 which are at least partially directed toward stops 60, when the label 120 is positioned against the stops. Thus, the circumferential edge of the label 120 is not subjected to air flows which could dislodge it from its position against the stops. Labels 120 of different shapes may be acquired and positioned using somewhat different arrays of jets and stops.

The invention has been described in detail with particular reference to certain preferred embodiments thereof, but it will be understood that variations and modifications can be effected within the spirit and scope of the invention.

What is claimed is:

1. A camera comprising:
   a casing enclosing a film area, said casing having a translucent region defining a stray light path into said film area;
   a label adhered to said casing, said label having an opaque portion covering said translucent region.

2. The camera of claim 1 wherein said casing has an opaque region thicker than and continuous with said translucent region.

3. The camera of claim 2 wherein said translucent region is imperforate.

4. The camera of claim 2 wherein said opaque region includes an obstruction boundary and said label is in registration with and overlaps said obstruction boundary.

5. The camera of claim 4 wherein said obstruction boundary borders said translucent region on at least one side.

6. The camera of claim 4 wherein said obstruction boundary surrounds said translucent region.

7. The camera of claim 4 wherein said casing has a grip element bordered by said obstruction boundary.

8. The camera of claim 7 wherein said casing has a grip element surrounding said translucent region.

9. The camera of claim 4 wherein said camera further comprises a control feature encompassed by said obstruction boundary.

10. The camera of claim 4 wherein said label is spaced from said obstruction boundary by 0.6 mm or less.

11. The camera of claim 4 wherein said label is spaced from said obstruction boundary by 0.4 mm or less.

12. The camera of claim 4 wherein said label is spaced from said obstruction boundary by 0.2 mm or less.

13. The camera of claim 1 wherein said casing has a grip element surrounding said translucent region.

14. The camera of claim 1 wherein said label is compliant.

15. The camera of claim 1 wherein said casing has an outside surface and an inside surface and said label is adhered to said outside surface.

16. A camera comprising:
    a frame defining a pair of opposed film chambers and an exposure chamber between said film chambers;
    a rear cover closing said chambers, said rear cover having a translucent region defining a stray light path into at least one of said chambers; and
    a label adhered to said rear cover, said label having an opaque portion covering said translucent region.

17. The camera of claim 16 wherein said rear cover has an opaque region thicker than and continuous with said translucent region.

18. The camera of claim 17 wherein said opaque region includes an obstruction boundary and said label is in registration with said obstruction boundary.

19. The camera of claim 18 wherein said obstruction boundary borders said translucent region.

20. A camera comprising:
    a casing enclosing a film area, said casing having an obstruction boundary and a light transmissive region;
    a label adhered to said casing, said label being spaced from said obstruction boundary by 0.6 mm or less, said label having an opaque portion covering said light transmissive region.

21. The camera of claim 20 wherein said label being spaced from said obstruction boundary by 0.4 mm or less.

22. The camera of claim 20 wherein said casing has an opaque region including said obstruction boundary and said light transmissive regions is continuous with and thinner than said opaque region.

23. A camera comprising:
    a casing enclosing a film area, said casing having a light translucent region defining a stray light path into said film area; and
    a label adhered to said casing, said label having an opaque portion covering said translucent region.

24. The camera of claim 23 wherein said casing has a label-placement obstruction having an obstruction boundary and said label is spaced from said obstruction boundary by a distance equal to or less than 0.6 mm.

25. A camera comprising:
    a casing enclosing a film area, said casing having a translucent region defining a stray light path into said film area, said casing being imperforate at said translucent region;
    a label adhered to said casing, said label having an opaque portion covering said translucent region.

26. A camera comprising:
    a casing enclosing a film area, said casing having an opaque region and a translucent region of one-piece with said opaque region, said translucent region defining a stray light path into said film area;
    a label adhered to said casing, said label having an opaque portion covering said translucent region.

* * * * *